United States Patent [19]

Hulsebosch

[11] Patent Number: 5,285,447
[45] Date of Patent: Feb. 8, 1994

[54] TARGET CHANNEL VERIFICATION IN A RADIOTELEPHONE SYSTEM

[75] Inventor: Thomas G. Hulsebosch, Palatine, Ill.

[73] Assignee: Motorola, Inc., Schaumburg, Ill.

[21] Appl. No.: 51,593

[22] Filed: Apr. 23, 1993

Related U.S. Application Data

[63] Continuation of Ser. No. 678,517, Apr. 1, 1991, abandoned.

[51] Int. Cl.$^5$ .............................................. H04B 7/26
[52] U.S. Cl. .................................... 370/69.1; 379/60; 455/33.2; 455/54.2; 455/56.1
[58] Field of Search ...................... 370/69.1, 76, 95.1; 379/60, 59, 63; 455/33.1, 33.2, 33.3, 33.4, 54.1, 54.2, 56.1

[56] References Cited

U.S. PATENT DOCUMENTS

| | | | |
|---|---|---|---|
| 4,696,027 | 9/1987 | Bonta | 379/60 |
| 4,704,734 | 11/1987 | Menich et al. | 455/33 |
| 4,765,753 | 8/1988 | Schmidt | 379/60 |
| 4,866,710 | 9/1989 | Schaeffer | 370/50 |
| 4,881,082 | 11/1989 | Graziano | 455/33 |
| 4,887,265 | 12/1989 | Felix | 370/94.1 |
| 5,042,082 | 8/1991 | Dahlin | 379/60 |

OTHER PUBLICATIONS

*Standards for Digital Mobile Telephone Systems,* Research & Development Center for Radio Systems (RCR), Tokyo, Japan, version 3, Mar. 1991.

*Primary Examiner*—Douglas W. Olms
*Assistant Examiner*—Min Jung
*Attorney, Agent, or Firm*—Richard A. Sonnentag; Raymond A. Jenski

[57] ABSTRACT

A radiotelephone system verifies the carrier/interference (C/I) of a selected target channel before handoff. The subscriber (125), communicating to a source base-station (130) on a source channel, measures the received signal strength indication (RSSI) of a target channel at a target base-station (135) when the channel is keyed (transmitting) and dekeyed (not transmitting). The subscriber (125) transfers the measurements to a source base-station (130) which determines the ratio of the RSSI with the keyed channel (C) to the RSSI with the dekeyed channel (I). If the ratio is greater than a predetermined threshold, the source base-station (130) transfers the subscriber (125) from the source channel to the target channel at the target base-station (135).

32 Claims, 4 Drawing Sheets

TARGET CHANNEL VERIFICATION IN A RADIOTELEPHONE SYSTEM

This is a continuation of application Ser. No. 07/678,517, filed Apr. 1, 1991 and now abandoned.

FIELD OF THE INVENTION

The invention relates generally to radiotelephone systems and more specifically to radiotelephone systems requiring handoff to maintain communication to a subscriber.

BACKGROUND OF THE INVENTION

In radiotelephone systems, handoff is required to maintain communication to a subscriber as it moves from one cellular coverage area to another. During handoff, a base-station communicating to a subscriber in a source cell, transfers communication from the source base-station to a target base-station in a cell in which the subscriber may also communicate. Typical radiotelephone systems employ scanning receivers in the base-stations, which, when in a target base-station, continuously scan the transmission of the subscriber. The use of scanning receivers, however, increases handoff message load throughout the system due to handoff initiation messages, handoff measurement requests, and handoff acknowledgments required.

Digital radiotelephone systems incorporate methods to help mitigate the message overload problem of typical radiotelephone systems. One such method has been to allow the subscriber or mobile to assist in the handoff process. This feature of mobile assisted handoff (MAHO) used in digital radiotelephone systems helps alleviate the requirement of scanning receivers by allowing the mobile to perform a similar such measurement on candidate target base-stations transmissions. In some radiotelephone systems, however, the mobile does not identify the source of the signal, so it is possible that the source of a measured signal is an interferer. Without knowledge of where the measured signal is actually originating from, using MAHO to determine the best target sector or target cell in a radiotelephone system would seem risky at best.

Thus, a need exists for a radiotelephone system which provides positive verification that a target sector or target cell picked by MAHO is a truly viable target.

SUMMARY OF THE INVENTION

A radiotelephone verifies a target channel before communication transfer. The radiotelephone system has a source base-station communicating with a subscriber unit on a source channel and the source base-station is coupled to a plurality of target base-stations. The radiotelephone system transmits, at a target base-station, on at least a first target channel and measures, at a subscriber unit, a first signal quality value of the transmission on at least a first target channel. The radiotelephone system selects, at a source base-station, the target base-station when an optimum first signal quality value is measured, and transmits, at the selected target base-station, on a second target channel. The radiotelephone system measures, at the subscriber unit, at least a second signal quality value of the transmission on a second target channel, and provides, at the source base-station, at least one communication transfer threshold. The radiotelephone system transfers communication of the subscriber unit from the source channel to the second target channel when the at least a second signal quality value is greater than the at least one communication transfer threshold.

DETAILED DESCRIPTION OF A PREFERRED EMBODIMENT

Figure 1:
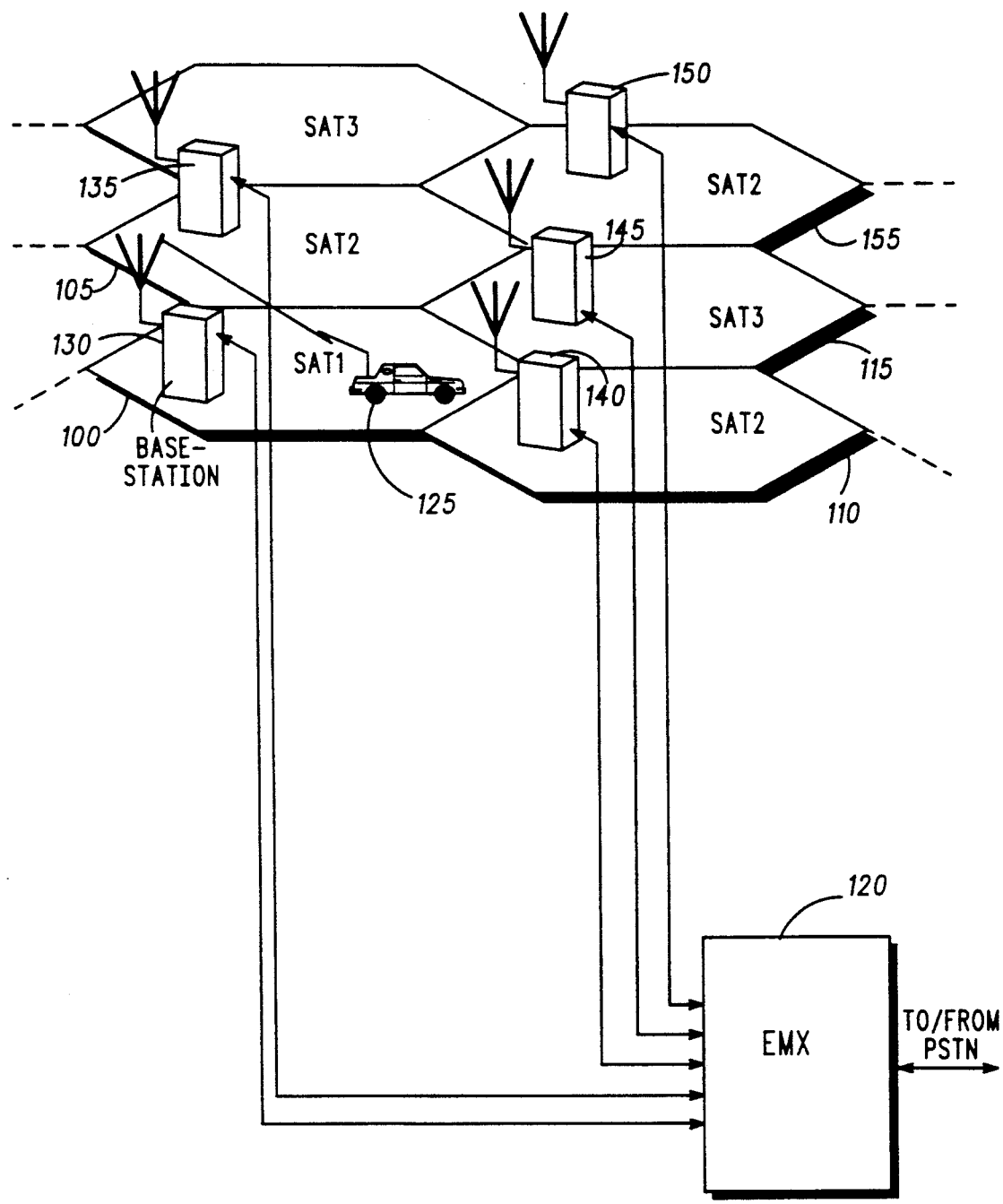
FIG. 1 generally depicts base-stations coupled to an EMX in a radiotelephone system that may be used to employ the present invention.

FIG. 1 generally depicts a cellular network which may employ the present invention. Cellular networks may incorporate as many different cells as is required to accommodate the coverage area. For example, a cell 100 typically covers only a small portion of the total coverage area in large cellular systems. As the cellular network grows in a particular coverage area, frequency reuse becomes an important parameter that is used to accommodate all the subscribers necessary. In some analog radiotelephone systems, a supervisory audio tone (SAT) is used to distinguish two different RF channels transmitting at the same frequencies in two different cells. Returning to FIG. 1, a first coverage area or cell 100 using a $SAT_1$ is bounded by six neighboring cells, but only two neighboring cells are shown for explanation purposes. A second coverage area or neighboring cell 105 has a SAT of $SAT_2$ while still another neighboring cell 110 has a SAT of $SAT_3$. Each of these cells has its own base-station, which is required to communicate to a subscriber 125. In the source cell 100, a source base-station 130 communicates to a subscriber 125 on a source channel which is a radio frequency (RF) signal at a particular frequency. $SAT_1$ is modulated on the RF signal by the source base-station 130 and is demodulated by the subscriber 125. $SAT_1$ is used by the subscriber 125 to identify the source cell 100 the subscriber 125 is located within. In sectorized cells (not shown), a similar method of communication transfer (called a port change) is used when the subscriber 125 moves from sector to sector within a given cell.

Each base-station within a particular cell in a cellular network is connected to an EMX 120 switch, available from Motorola, Inc. and described in Motorola Instruction Manual No. 68P81054E59 published by Motorola Service Publications, Schaumburg, Ill. The EMX 120, and more particularly the three party circuit (not shown) in the EMX 120, is the interface between the base-stations within the cells and the public switched telephone network (PSTN), which is the land-line system. The EMX 120 also serves as a junction point between base-stations in a cellular network. For example, as the subscriber moves throughout the source cell 100, the base-station 130 continuously monitors the received signal strength indication (RSSI) of the subscriber 125. As the subscriber 125 moves away from the base-station 130, the RSSI of the subscriber 125 eventually falls below a transfer threshold. The source base-station 130, via the EMX 120, sends a message, which includes the source RSSI measurement, to all neighboring cells, but again for the example only neighboring cells 105, 110 are shown. If target base-stations 135, 140 receive the transmission of the subscriber 125 and if the handoff criterion is met for the particular cell 105, 110, the target base-stations 135, 140 will send a response to the EMX 120 noting such. Target base-station 135,140 will meet the handoff criterion if the RSSI measured at the target base-stations 135, 140, plus some hysteresis value is greater than the RSSI measured by the source base-station 130. The hysteresis value is used by neighboring base-stations 135, 140 in part to take into account the physically different locations of the target base-stations 135, 140 with respect to the source base-station 130. In addition, to ensure that the target base-station 135,140 RSSI is noticeably better than the source base-station 130 RSSI, the hysteresis value is added to the target base-station 135,140 RSSI before the comparison is made.

Each of the base-stations 130, 135, 140, 145, and 150 includes a plurality of transmitters and receivers for operating on at least one duplex signalling channel and a plurality of duplex voice channels. One conventional analog system employs transmitters and receivers of the type described in Motorola Instruction Manual No. 68P81058E32A published by Motorola Service Publications, Schaumburg, Ill., in 1989. The use of mobile assisted handoff (MAHO) is particularly applicable to digital cellular systems. Several such systems that incorporates MAHO is the United States Digital Cellular System (USDC) defined in EIA/TIA, Project Number 2215 titled "*Dual-Mode Mobile Station-Base-station Compatibility Standard*" dated December 1989 and the Japan Digital Cellular Standard (JDC) defined by the *Research and Development Center for Radio Systems in Japan (RCR)*, dated January 1991. As is the case in analog cellular systems, digital cellular systems use a cell identification value called the digital voice colour code (DVCC). In the preferred embodiment, up to 256 DVCC's are available. Thus, in a given cellular coverage area, each cell has a distinct DVCC associated to a corresponding base-station. When the base-station transmits a broadcast signal throughout its coverage area, the broadcast signal has the DVCC value modulated on it. This concept is similar to the SAT concept used in analog cellular.

Since MAHO incorporated in USDC does not measure the SAT of an analog voice channel, or the DVCC of a digital traffic channel, there is not an obvious way of positively identifying the source of a signal represented by the MAHO reports. During MAHO, the subscriber unit is measuring a signal quality value or received signal strength indication (RSSI) of not only the source transmission, but also transmissions of neighboring or target base-stations. Since positive identification of either the source or targets base-stations is not available, the use of MAHO to determine and potentially initiate the handoff is risky at best.

Figure 2:
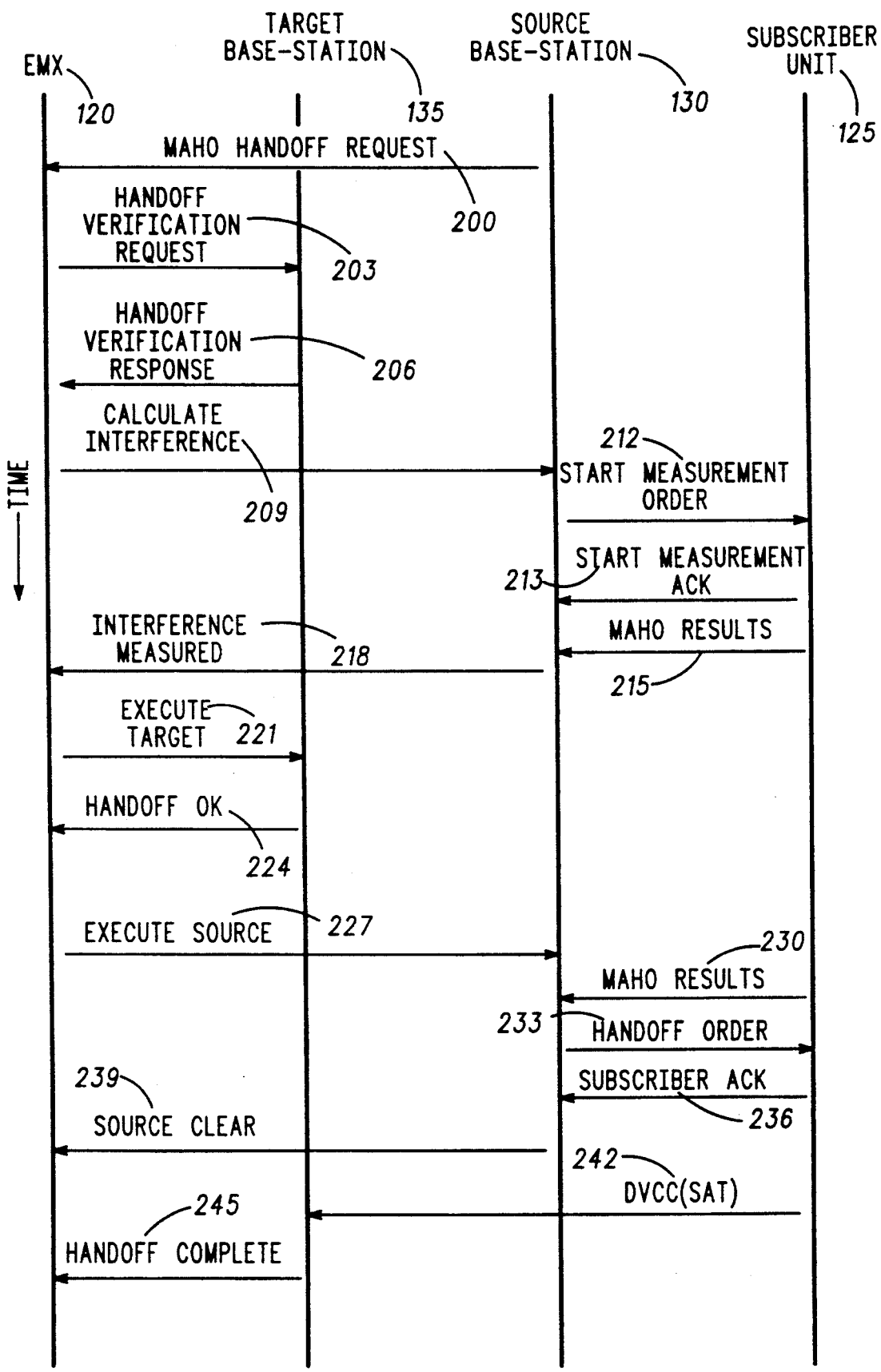
FIG. 2 depicts the preferred embodiment of a method of positively verifying a target sector or target cell chosen by MAHO in accordance with the invention.

FIG. 2 depicts the preferred embodiment of a method of positively verifying a target sector or target cell chosen by MAHO in accordance with the invention. If the target channel, which is a RF signal at a particular frequency, is in an analog system, this method can always be used since a RF channel will either be idle or in use. If the target channel is in a digital system, and since one RF channel may have multiple time slots modulated thereon, this method can only be done if the channel is completely idle. In the preferred embodiment, the target channel that is verified is the actual communication channel that the subscriber unit 125 will be handed off to in the target cell 105. Initially, MAHO measures the RSSI of a signalling channel, which is a channel continuously transmitted by target base-stations. The process begins when the source base-station 130 detects a better sector or cell for communication to the subscriber 125 and informs the EMX 120 which cell or sector. The source base-station 130 sends at 200 a MAHO handoff request to the EMX 120. The EMX 120 relays at 203 a handoff verification request to neighboring target base-stations, which for the example will be target base-station 135. The target base-station 135, if a channel is available, sends at 206 a handoff verification response to the EMX 120 which includes the target channel. The EMX 120 sends a message at 209 to the source base-station 130 telling it to calculate the interference at the target channel frequency. In this message at 209, the target base-station 135 and corresponding channel frequency of the target base-station is relayed to the source base-station 130.

The source base-station 130 now sends at 212 a start measurement order to the subscriber unit 125. The start measurement order includes the target channel frequency of the target base-station 135. The subscriber unit 125 sends at 213 a start measurement acknowledgement to the source base-station 130 and begins to measure the RSSI at the target channel frequency of the target base-station 135. At this point however, the target base-station 135 has not begun transmission on the target channel. The subscriber unit 125 sends at 215 the MAHO results back to the source base-station 130. The source base-station 130 relays at 218 the interference measurements to the EMX 120. The EMX 120 sends at 221 an execute target command which informs the target base-station 135 to begin transmission on the target channel. The target base-station 135 sends at 224 a handoff ok message to the EMX 120 which in turn sends at 227 an execute source command to the source base-station 130. The execute source command tells the source base-station 130 to start looking for new MAHO results. The new MAHO results represent the signal strength of transmissions by the target base-station 135 at the target channel frequency. The subscriber unit 125 sends at 230 the MAHO results to the source base-station 130. The source base-station 130 then calculates the ratio of the carrier measurements just received at 230 to the interfere measurements received at 215. If the carrier to interference (C/I) is above a target channel quality transfer threshold, the source base-station 130 will send at 233 a handoff order to the subscriber unit 125. The handoff order contains the target channel and the target channel frequency of the now transmitting target base-station 135. The subscriber unit 125 will tune to the target channel frequency and begin transmission to the target base-station 135. The subscriber unit 125 sends at 236 an acknowledgement to the source base-station 130 which in turn relays at 239 a source clear command to the EMX 120. The subscriber unit 125 then sends at 242 the DVCC in a digital system or the SAT in an analog system to the target base-station 135. Upon receiving the DVCC or the SAT, the target base-station 135 sends at 245 a handoff complete message to the EMX 120, notifying the EMX that the handoff process has been completed.

Figure 3:
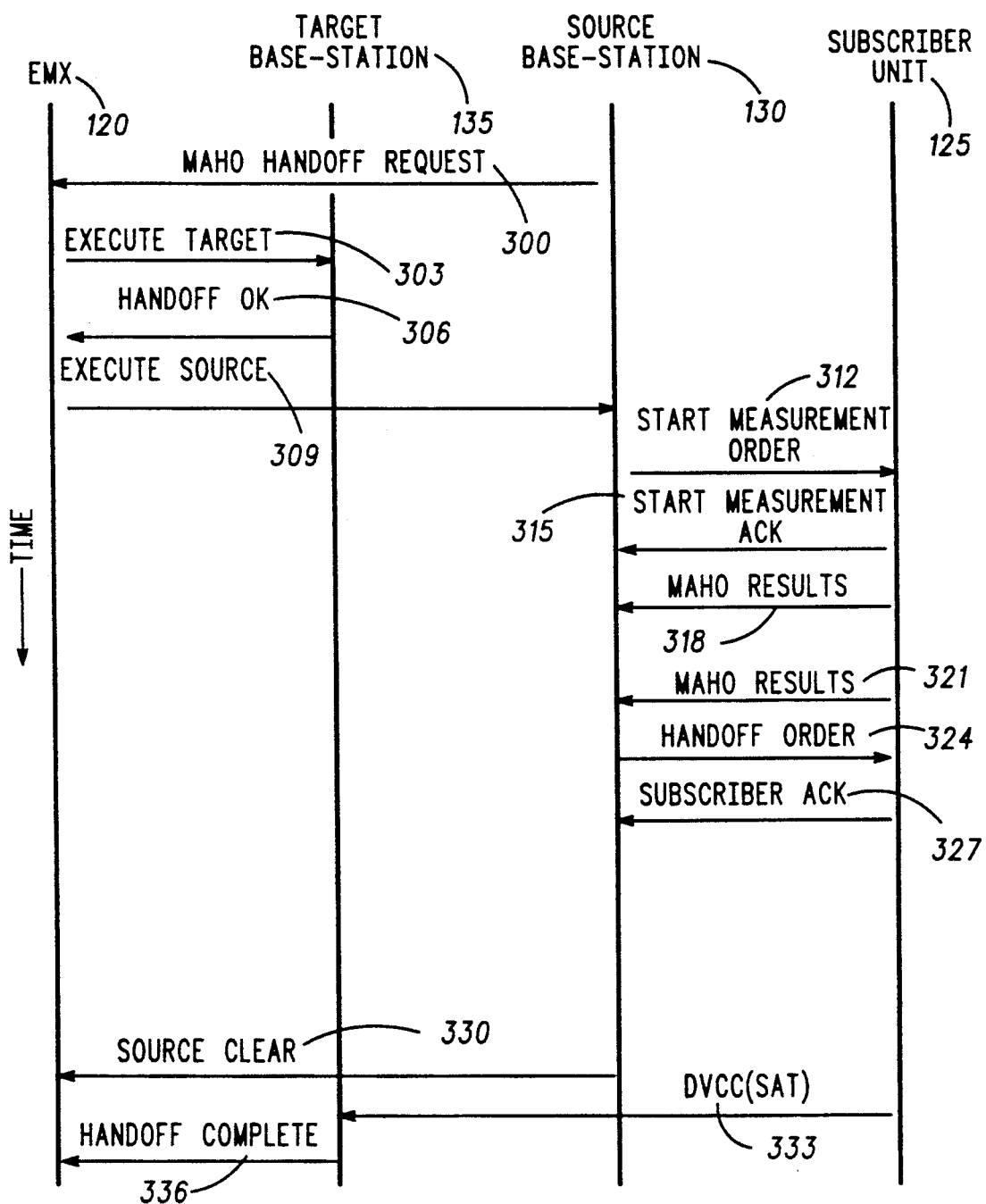
FIG. 3 depicts an alternate embodiment of a method of positively verifying a target sector or target cell chosen by MAHO in accordance with the invention.

FIG. 3 depicts an alternate embodiment of a method of positively verifying a target sector or target cell chosen by MAHO in accordance with the invention.

The method requires greater clock synchronization between the source base-station 130, target base-station 135, and the EMX 120. In this embodiment, the target channel is not the actual communication channel that the subscriber unit 125 will be handed off to, but rather is a verification channel that is used to represent a typical channel in the target cell 105. The method starts when the source base-station 130 detects a better sector or cell and informs the EMX 120 which sector or cell. The source base-station sends at 300 the MAHO handoff request to the EMX 120. At this point, the EMX sends at 303 an execute target message to the target base-station 135. The target base-station 135 allocates a traffic channel (TCH) in the desired sector or cell. The target base-station 135 then sends at 306 a handoff ok message to the EMX 120 containing the allocated TCH the subscriber unit 125 should tune to if the C/I of the target sector or cell is adequate. The target channel that the subscriber unit 125 should use to detect the C/I within the desired sector or cell is also included in the handoff ok message. The EMX 120 sends at 309 an execute source message to the source base-station 130 telling it to measure the target channel in the target sector or cell. To determine the C/I of the target channel, the target base-station 135 continuously keys and dekeys (turns the transmitter on and off) the target channel. This is necessary for the subscriber unit to take a measurement with a carrier present and without the carrier present. The source base-station 130 then sends at 312 a start measurement order to the subscriber unit 125 and upon receipt of this order, the subscriber unit 125 begins measurement and sends at 315 a start measurement acknowledge back to the source base-station 130. The subscriber unit 125 will measure the RSSI of the target channel transmitted by the target base-station 135. When the transmitter of the target base-station 135 is keyed, the carrier (C) measurement is taken and MAHO results are sent at 318 back to the source base-station 130. When the transmitter of the target base-station 135 is dekeyed, the subscriber unit 125 will measure the interference (I) corresponding to the target channel and send at 321 MAHO results to the source base-station 130. Clock synchronization between the source base-station 130, target base-station 135, and the EMX 120 is important at this point because the source base-station 130 has know when C measurements are being taken and when I measurements are being taken. At this point, the C/I is determined at the source base-station 130, and if the C/I ratio is adequate or greater than a target channel quality transfer threshold, the source base-station 130 will send at 324 a handoff order to the subscriber unit 125. The subscriber unit 125 sets up to the previously allocated TCH and sends at 327 an acknowledgement message to the source base-station 130 which in turn sends at 330 a source clear message to the EMX 120. The subscriber unit 125 then sends at 333 the DVCC for a digital system and the SAT for an analog system to the target base-station 135. The target base-station 135 sends at 336 a handoff complete message to the EMX 120, signifying that handoff of the subscriber unit 125 has been completed to the target base-station 135.

Figure 4:
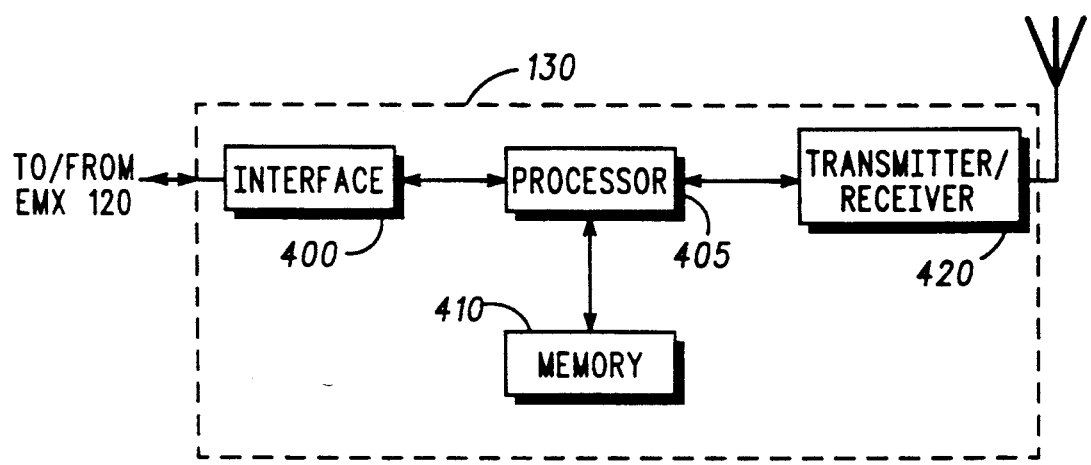
FIG. 4 generally depicts a block diagram of the source base-site and the target base-sites shown in FIG. 1.

FIG. 4 generally depicts a block diagram of a base-station used to implement the present invention. FIG. 4 depicts the source base-station 130 but should also be used to generally depict all base-stations, as shown in FIG. 1. An interface 400 connects the base-station 130 to the EMX 120. The interface 400 is coupled to a processor, which in the preferred embodiment is a Motorola 68030 microprocessor. The processor 405 is also coupled to a memory block 410, which includes RAM and ROM. The processor 405 is coupled to a transmitter/receiver 420 which interfaces between the processor and the channel being transmitted by the base-station 130. Data entering the base-station 130 from the EMX 120 is input into the interface 400 and sent to the processor 405. The processor 405 accesses the memory 410 to retrieve the required calibration/hysteresis factors necessary for transmission and reception. The processor 405 sends the data to the transmitter/receiver 420, where the information is modulated onto a RF channel and transmitted to the subscriber unit 125.

Using the methods in accordance with the invention, the C/I of the target channel that a subscriber unit 125 will be handed off to is verified before handoff. The method uses the MAHO capability of the subscriber unit 125 to eliminate what scanning receivers at the base-stations previously performed. This reduces the amount of messages required since the amount of base-station hardware is reduced. In addition, the C/I of the target channel chosen by MAHO is used as a criterion for handoff, which increases the likelihood of a successful handoff.

What I claim is:

1. A radiotelephone system having target channel verification before communication transfer, the radiotelephone system having a source base-station communicating with a subscriber unit on a source channel, the source base-station coupled to a plurality of target base-stations, the radiotelephone system comprising:

a plurality of target base-stations for transmitting on a plurality of signalling channels and for transmitting on a target channel;

a subscriber unit for measuring first signal quality values of said transmissions on said plurality of signalling channels and a second signal quality value of said transmission on said target channel; and a source base-station for selecting one of said plurality of target base-stations to transmit on said target channel based on said first signal quality value measurement, and for transferring communication of the subscriber unit from the source channel to the target channel when said second signal quality value is greater than a transfer threshold.

2. The radiotelephone system of claim 1 wherein said target channel is a new source channel after communication transfer.

3. The radiotelephone system of claim 1 wherein said subscriber unit for measuring a first signal quality value further comprises a subscriber unit for measuring a first signal strength value.

4. The radiotelephone system of claim 1 wherein said source base-station for selecting further comprises a source base-station having a hysteresis value correlating the physical location of said source base-station to each of said target base-stations.

5. The radiotelephone system of claim 4 wherein said source base-station for selecting further comprises a source base-station which adds said first signal quality values of said transmissions on said plurality of signalling channels to each corresponding hysteresis value to produce first modified signal quality values.

6. The radiotelephone system of claim 5 wherein said source base-station for selecting further comprises a source base-station for selecting said target base-station based on said first modified signal quality values.

7. The radiotelephone system of claim 4 wherein said source base-station for transferring communication further comprises a source base-station for transferring communication of the subscriber unit from the source channel to the target channel when said second signal quality value plus a hysteresis value corresponding to the selected target base-station is greater than said transfer threshold.

8. A radiotelephone system having target channel verification before communication transfer, the radiotelephone system having a source base-station communicating with a subscriber unit on a source channel, the source base-station located within a first coverage area and coupled to a plurality of target base-stations via a base-station interface, the plurality of target base-stations located within a corresponding plurality of coverage areas, the radiotelephone system comprising:
 a plurality of target base-stations for transmitting on a plurality of signalling channels and for transmitting on a target channel;
 a subscriber unit for measuring a first signal quality value of said transmissions on said plurality of signalling channels, for measuring a second signal quality value in the absence of a transmission on said target channel to produce an interference measurement (I), and for measuring a third signal quality value of a transmission on said target channel to produce a carrier measurement (C); and
 a source base-station for selecting one of said plurality of target base-stations to transmit based on said first signal quality value measurement, and
 for transferring communication of the subscriber unit from the source channel to said target channel when the ratio of said carrier measurement (C) to said interference measurement (I) is greater than a transfer threshold.

9. The radiotelephone system of claim 8 wherein said target channel is a new source channel after communication transfer.

10. The radiotelephone system of claim 8 wherein said subscriber unit for measuring a first signal quality value further comprises a subscriber unit for measuring a first signal strength value.

11. The radiotelephone system of claim 8 wherein said source base-station for selecting further comprises a source base-station having a hysteresis value correlating the physical location of said source base-station to each of said target base-stations.

12. The radiotelephone system of claim 11 wherein said source base-station for selecting further comprises a source base-station which adds said first signal quality values of said transmissions on said plurality of signalling channels to each corresponding hysteresis value to produce first modified signal quality values.

13. The radiotelephone system of claim 12 wherein said source base-station for selecting further comprises a source base-station for selecting said target base-station based on said first modified signal quality values.

14. The radiotelephone system of claim 11 wherein said source base-station for transferring communication further comprises a source base-station for transferring communication of the subscriber unit from the source channel to the target channel when the ratio of said measured third signal quality value to said measured second signal quality value, plus a hysteresis value corresponding to the selected target base-station, is greater than said transfer threshold.

15. A time-division multiple access (TDMA) radiotelephone system having target channel verification before communication transfer, the TDMA radiotelephone system having a source base-station communicating with a subscriber unit on a source channel during at least one of a plurality of TDMA timeslots, the source base-station located within a first coverage area and coupled to a plurality of target base-stations via a base-station interface, the plurality of target base-stations located within a corresponding plurality of coverage areas, the TDMA radiotelephone system comprising:
 a plurality of target base-stations for transmitting on a plurality of signalling channels during one of a plurality of TDMA timeslots and for transmitting on a target channel during a second one of said plurality of TDMA timeslots;
 a subscriber unit for measuring a first signal quality value of said transmissions on said plurality of signalling channels during at least one of a plurality of TDMA timeslots, for measuring a second signal quality value in the absence of a transmission of said target channel during said second one of said plurality of TDMA timeslots to produce an interference measurement (i), and for measuring a third signal quality value of a transmission of said target channel during said second one of said plurality of TDMA timeslots to produce a carrier measurement (C); and
 a source base-station for selecting one of said plurality of target base-stations to transmit on said target channel during said second one of said plurality of TDMA timeslots based on said first signal quality value measurement, and
 for transferring communication of the subscriber unit from the source channel to said target channel when the ratio of said carrier measurement (C) to said interference measurement (I) is greater than a transfer threshold.

16. The TDMA radiotelephone system of claim 15 wherein said subscriber unit for measuring a first signal quality value further comprises a subscriber unit for measuring a first signal strength value.

17. The TDMA radiotelephone system of claim 15 wherein said source base-station for selecting further comprises a source base-station having a hysteresis value correlating the physical location of said source base-station to each of said target base-stations.

18. The TDMA radiotelephone system of claim 17 wherein said source base-station for selecting further comprises a source base-station which adds said first signal quality values of said transmissions on said plurality of signalling channels to each corresponding hysteresis value to produce first modified signal quality values.

19. The TDMA radiotelephone system of claim 18 wherein said source base-station for selecting further comprises a source base-station for selecting said target base-station based on said first modified signal quality values.

20. The TDMA radiotelephone system of claim 17 wherein said source base-station for transferring communication further comprises a source base-station for transferring communication of the subscriber unit from the source channel to said target channel when the ratio of said measured third signal quality value to said measured second signal quality value, plus a hysteresis value corresponding to the selected target base-station, is greater than said transfer threshold.

21. A method of verifying a target channel before communication transfer in a radiotelephone system, the radiotelephone system having a source base-station communicating with a subscriber unit on a source channel, the source base-station located within a first coverage area and coupled to a plurality of target base-stations via a base-station interface, the plurality of target base-stations located within a corresponding plurality of coverage areas, the method comprising the steps of:

transmitting, at a plurality of target base-stations, on a plurality of signalling channels;

measuring, at the subscriber unit, a first signal quality value of said transmissions on said plurality of signalling channels;

selecting, at the source base-station, one of said plurality of target base-stations based on an optimum first signal quality value measurement;

transmitting, at the selected target base-station, on a target channel;

measuring, at the subscriber unit, a second signal quality value in the absence of said transmission on a target channel to produce an interference measurement (I);

measuring, at the subscriber unit, a third signal quality value of said transmission on said target channel to produce a carrier measurement (C);

providing, at the source base-station, a target channel quality transfer threshold; and transferring communication of the subscriber unit from the source channel to said target channel when the ratio of said carrier measurement (C) to said interference measurement (I) is greater than said target channel quality transfer threshold.

22. The radiotelephone system of claim 21 wherein said first target channel is a signalling channel and wherein said step of measuring a first signal quality value further comprises the step of measuring a first signal strength value.

23. The radiotelephone system of claim 21 wherein said step of selecting further comprises the step of providing a hysteresis value correlating the physical location of the source base-station to said target base-station.

24. The radiotelephone system of claim 23 wherein said step of selecting further comprises the step of adding said first signal quality value of said transmission on at least a first channel to said hysteresis value to produce a first modified signal quality value.

25. The radiotelephone system of claim 24 wherein said step of selecting further comprises the step of selecting said target base-station when an optimum first modified signal quality value is produced.

26. The radiotelephone system of claim 23 wherein said step of transferring communication further comprises the step of transferring communication of the subscriber unit from the source channel to the second target channel when the ratio of said measured third signal quality value to said measured second signal quality value, plus said hysteresis value, is greater than said target channel quality transfer threshold.

27. A method of verifying a target channel before communication transfer in a time-division multiple access (TDMA) radiotelephone system, the TDMA radiotelephone system having a source base-station communicating with a subscriber unit on a source channel during at least one of a plurality of TDMA timeslots, the source base-station located within a first coverage area and coupled to a plurality of target base-stations via a base-station interface, the plurality of target base-stations located within a corresponding plurality of coverage areas, the method comprising the steps of:

transmitting, at a plurality of target base-stations, on a plurality of signalling channels during at least one of a plurality of TDMA timeslots;

measuring, at the subscriber unit, a first signal quality value of said transmissions on said plurality of signalling channels during at least one of a plurality of TDMA timeslots;

selecting, at the source base-station, one of said plurality of target base-stations based on an optimum first signal quality value measurement;

transmitting, at the selected target base-station, on a target channel during at least a second one of said plurality of TDMA timeslots;

determining, at the subscriber unit, which of said remaining TDMA timeslots on said target channel is unoccupied;

measuring, at the subscriber unit, at least a second signal quality value in the absence of said transmission on said target channel to produce an interference measurement (I);

measuring, at the subscriber unit and responsive to said step of determining, a third signal quality value of said transmission on said target channel during an unoccupied TDMA timeslot to produce a carrier measurement (C);

providing, at the source base-station, a target channel quality transfer threshold; and transferring communication of the subscriber unit from the source channel to said target channel when the ratio of said carrier measurement (C) to said interference measurement (I) is greater than said target channel quality transfer threshold.

28. The TDMA radiotelephone system of claim 27 wherein said step of measuring a first signal quality value further comprises the step of measuring a first signal strength value.

29. The TDMA radiotelephone system of claim 27 wherein said step of selecting further comprises the step of providing a hysteresis value correlating the physical location of the source base-station to said target base-station.

30. The TDMA radiotelephone system of claim 29 wherein said step of selecting further comprises the step of adding said first signal quality value of said transmission on at least a first channel to said hysteresis value to produce a first modified signal quality value.

31. The TDMA radiotelephone system of claim 30 wherein said step of selecting further comprises the step of selecting said target base-station when an optimum first modified signal quality value is produced.

32. The TDMA radiotelephone system of claim 29 wherein said step of transferring communication further comprises the step of transferring communication of the subscriber unit from the source channel to said at least a first target channel when the ratio of said measured third signal quality value to said measured second signal quality value, plus said hysteresis value, is greater than said target channel quality transfer threshold.

* * * * *